(12) United States Patent
Yamazaki et al.

(10) Patent No.: US 7,831,852 B2
(45) Date of Patent: Nov. 9, 2010

(54) POWER SUPPLY MANAGEMENT SYSTEM FOR CHANGING THE PATH OF AN INTERNAL POWER SUPPLY OF A DEVICE

(75) Inventors: Yukio Yamazaki, Ebina (JP); Taketoshi Yamaguchi, Atsugi (JP); Kouichi Azuma, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 745 days.

(21) Appl. No.: 11/808,693

(22) Filed: Jun. 12, 2007

(65) Prior Publication Data
US 2008/0098250 A1    Apr. 24, 2008

(30) Foreign Application Priority Data
Oct. 20, 2006    (JP)    ............... 2006-285810

(51) Int. Cl.
G06F 1/26    (2006.01)
(52) U.S. Cl. .................... 713/324; 713/300; 713/330
(58) Field of Classification Search ................. 713/324, 713/300
See application file for complete search history.

(56) References Cited

U.S. PATENT DOCUMENTS

| | | | | |
|---|---|---|---|---|
| 5,938,770 A | * | 8/1999 | Kim | ............... 713/300 |
| 6,516,418 B1 | * | 2/2003 | Lee | ............... 713/320 |
| 6,643,566 B1 | * | 11/2003 | Lehr et al. | ............... 700/286 |
| 7,203,849 B2 | * | 4/2007 | Dove | ............... 713/300 |
| 7,376,847 B2 | * | 5/2008 | Chen et al. | ............... 713/300 |
| 7,400,062 B2 | * | 7/2008 | Pincu et al. | ............... 307/29 |
| 7,433,712 B2 | * | 10/2008 | Moran et al. | ............... 455/557 |
| 7,441,133 B2 | * | 10/2008 | Giat et al. | ............... 713/300 |
| 7,478,251 B1 | * | 1/2009 | Diab et al. | ............... 713/300 |
| 7,498,692 B2 | * | 3/2009 | Grolnic et al. | ............... 307/66 |
| 7,567,579 B2 | * | 7/2009 | Korcharz et al. | ............... 370/401 |
| 2007/0277049 A1 | * | 11/2007 | Hansalia | ............... 713/321 |

FOREIGN PATENT DOCUMENTS

JP    A 2002-142385    5/2002

* cited by examiner

*Primary Examiner*—Nitin C Patel
(74) *Attorney, Agent, or Firm*—Oliff & Berridge, PLC (57) ABSTRACT

The power supply management system is provided with an information processor and a terminal that is connected to the information processor by a communication line and a power supply line and that is controlled for power supply by the information processor. The terminal includes a monitor unit that is capable of monitoring at least any one of a signal received from the outside through the communication line and a signal detected inside by using the electric power supplied through the power supply line and a change unit that changes an internal power supply path so as to supply electric power other than the electric power supplied through the power supply line on the basis of the monitoring results of the monitor unit.

18 Claims, 10 Drawing Sheets

POWER SUPPLY MANAGEMENT SYSTEM FOR CHANGING THE PATH OF AN INTERNAL POWER SUPPLY OF A DEVICE

CROSS-REFERENCE TO RELATED APPLICATION

This application is based on and claims priority under 35 USC 119 from Japanese Patent Application No. 2006-285810 filed Oct. 20, 2006.

BACKGROUND

1. Technical Field

The present invention relates to a power supply management system, a terminal, an information processor, a power supply management method and a computer readable medium storing a program.

2. Related Art

The related art which realizes stable operation of the whole system by managing the amount of power consumption of an apparatus connected to a network is disclosed.

SUMMARY

According to an aspect of the invention, there is provided a power supply management system including: an information processor; and a terminal that is connected to the information processor by a communication line and a power supply line and that is controlled for power supply by the information processor. The terminal includes a monitor unit that is capable of monitoring at least any one of a signal received from the outside through the communication line and a signal detected inside by using the electric power supplied through the power supply line, and a change unit that changes an internal power supply path so as to supply electric power other than the electric power supplied through the power supply line on the basis of the monitoring results of the monitor unit.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the invention will be described in detail with reference to the drawings.

Figure 1:
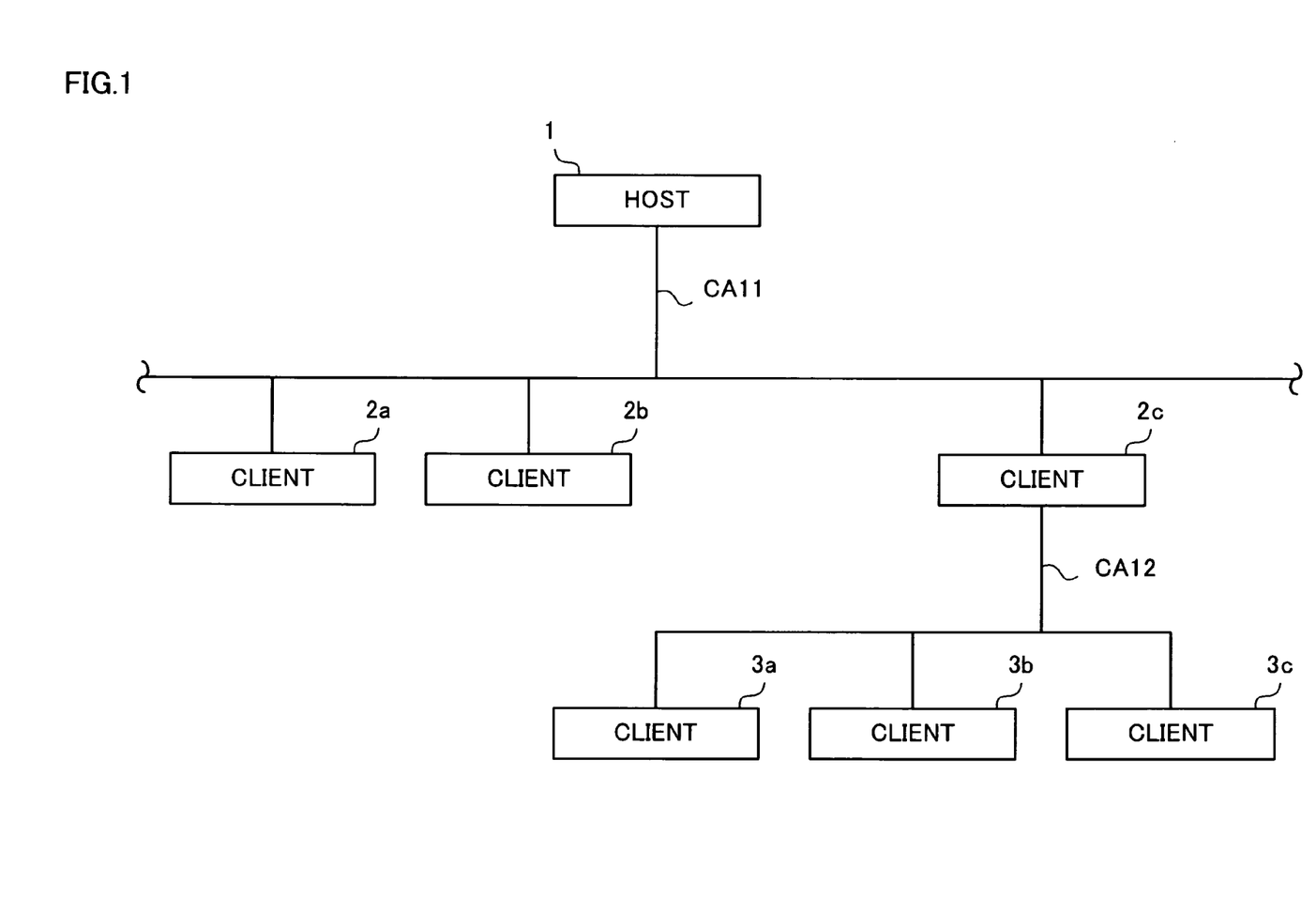
FIG. 1 is a schematic diagram illustrating a power supply management system according to the exemplary embodiment.

FIG. 1 is a schematic diagram illustrating a power supply management system according to the exemplary embodiment.

As shown in FIG. 1, a host computer (hereinafter 'host') (information processor, computer) 1 is connected to client computers (hereinafter 'clients') (upper-level client, terminal, device) 2a, 2b, and 2c through a cable CA11. The client 2c is connected to clients (lower-level client, device) 3a, 3b, and 3c through a cable CA12. As described above, a tree-structured network system is indicated in the exemplary embodiment. The network system may be installed, for example, in an office.

The host 1 may be configured as, for example, a computer, a switching hub supplying power to a communication line, or the like. The clients 2a to 2c and 3a to 3c may be configured as office devices, specifically for example, image forming apparatuses, printers, personal computers, or various home electric appliances connected to the network. In this exemplary embodiment, the host 1 and the clients 2a to 2c and 3a to 3c are described by clearly differentiating their, function, but there may be a case that the host itself may take the function of the clients 2a to 2c and 3a to 3c.

Figure 2:
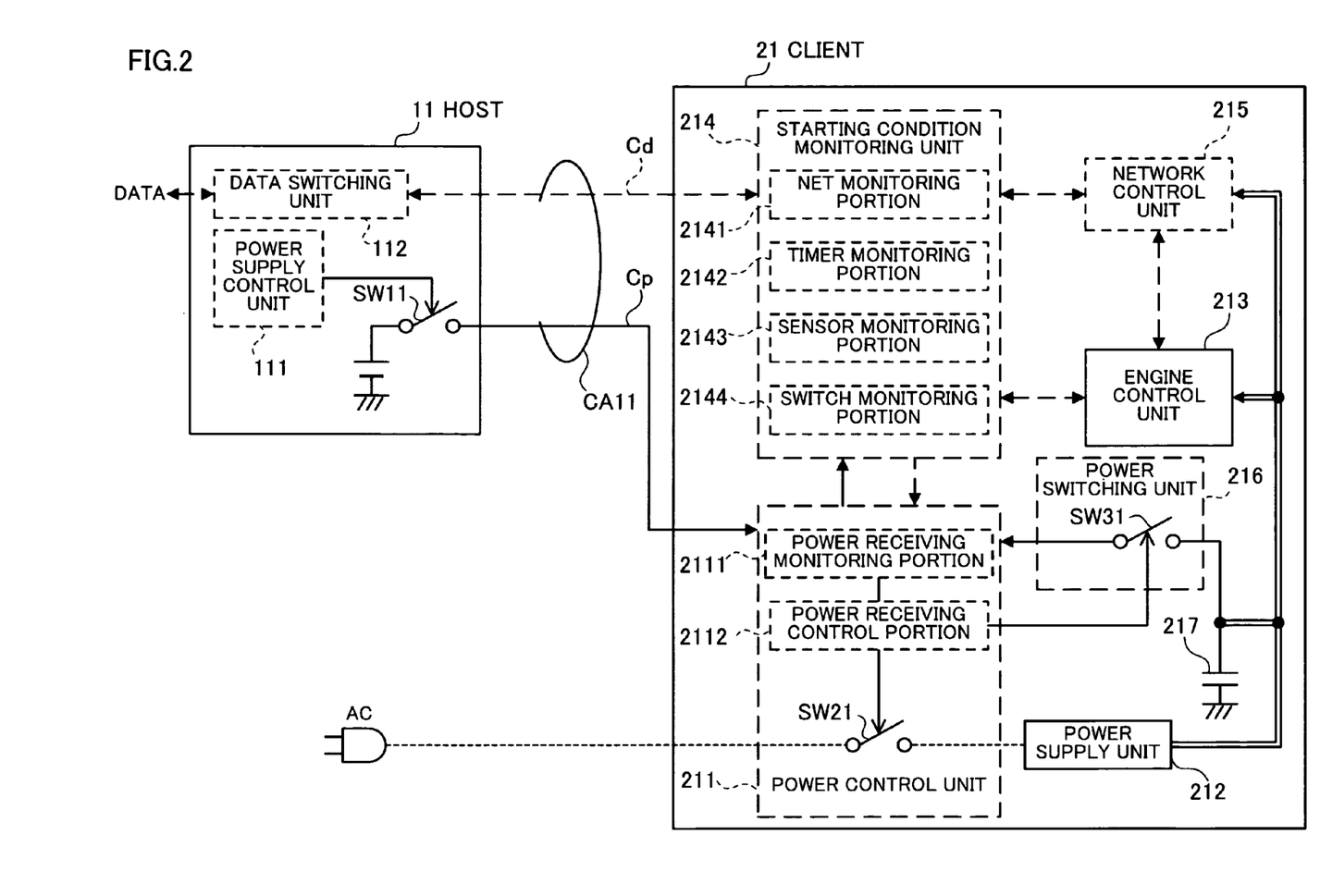
FIG. 2 is a block diagram illustrating a configuration of the host and the client according to the first exemplary embodiment.

Each of the cables (net cable) CA11 and CA12 described herein refers to a cable formed of a pair of a data communication line Cd (see FIG. 2 for reference) and a power supply line Cp (see FIG. 2 for reference). That is, data is sent and received between the host 1 and the clients 2a to 2c through the data communication line Cd of the cable CA11. Data is sent and received between the client 2c and the clients 3a to 3c through the data communication line Cd of the cable CA12. The host 1 supplies the electric power to the clients 2a to 2c through the power supply line Cp of the cable CA11 and the client 2c supplies the electric power to the clients 3a to 3c through the power supply line Cp of the cable CA12. As described above, in the exemplary embodiment, the devices are respectively connected by the cable CA11 or CA12 through which the data is sent and received and the electric power is supplied. In other words, the host 1, the clients 2a to 2c and the clients 3a to 3c are connected to a power supply network as a tree-structured network system.

By the power supply lines Cp of the cables CA11 and CA12, for example, it is possible to supply the electric power of the maximum 12.95 W at an input voltage in the range of 36 to 57 V. For this reason, a low-power device may be operated without an internal power supply. An image forming apparatus as the clients 2a to 2c in the exemplary embodiment has an AC power supply as a driving power supply in addition to the power supply lines Cp of the cables CA11 and CA12. It may be considered that a technique of supplying electric power meets the standard specification called IEEE 802.3af, which supplies the electric power to the clients 2a to 2c and the clients 3a to 3c or sends and receives the data through the power supply network such as Power-over-Ethernet™.

As described above, the data communication line Cd and the power supply line Cp are configured as a pair. However, even when the electric power is superposed on the data communication line Cd, the effect does not change.

First Exemplary Embodiment

FIG. 2 is a block diagram illustrating a configuration of the host 11 and client 21 according to the first exemplary embodiment.

As shown in FIG. 2, the host 11 includes a switch (change unit, switch element) SW11, a power supply control unit (change unit, detection unit) 111, and a data switching unit 112. Solid-line arrows shown in FIG. 2 indicate power supply paths. Broken-line arrows shown in FIG. 2 indicate data communication paths. The switch SW11 is disposed between the power supply unit and the power supply line Cp. Specifically, when the switch SW11 is turned on, the electric power is supplied to the client 21 through the power supply line Cp. When the switch SW11 is turned off, the electric power is not supplied to the client 21 through the power supply line cp.

The power supply control unit 111 turns the switch SW11 on or turns the switch SW11 off. That is, the power supply control unit 111 turns the switch SW11 on when the power supply control unit 111 judges that the electric power is needed to be supplied to a power control unit (monitor unit) 211 and/or a starting condition monitoring unit (monitor unit) 214 of the client 21 that are described later. The power supply control unit 111 turns the switch SW11 off when the power supply control unit 111 judges that the electric power is not needed to be supplied to the power control unit 211 and the starting condition monitoring unit 214 of the client 21.

The power supply control unit 111 also controls a switch (change unit, switch element) SW21 of the power control unit 211 and a switch (change unit, switch element) SW31 of a power switching unit 216 that are described later. That is, the power supply control unit 111 instructs a power receiving control portion (change unit) 2112 of the power control unit 211 to turn the switches SW21 and SW31 on or turn the switches SW21 and SW31 off through the data communication line Cd and through the starting condition monitoring unit 214.

The data switching unit 112 selects the optimal one among plural clients (see reference numerals 2a, 2b, and 2c in FIG. 1 for reference) connected to the host 11, and then the data switching unit 112 receives the data from the selected client and sends the data to the selected client. When the electric power is not supplied to the selected client, the data switching unit 112 communicates with the power supply control unit 111 and controls the power supply for the selected client so that the electric power is started to supply to the selected client.

As shown in FIG. 2, the client 21 includes a power control unit 211, a power supply unit 212, an engine control unit 213, a starting condition monitoring unit (trigger monitoring unit) 214, a network control unit 215, a power switching unit 216, and a power storing unit 217.

The solid-line arrows in the client 21 shown in FIG. 2 indicate power supply paths. That is, the power control unit 211 supplies the electric power to the starting condition monitoring unit 214. The broken-line arrow between the power control unit 211 and the starting condition monitoring unit 214 indicates a data communication path. In addition, the broken-line arrows interconnected among the engine control unit 213, the starting condition monitoring unit 214, and the network control unit 215 indicate the data communication paths. Further, the double-line arrows extending from the power supply unit 212 to the engine control unit 213 and the network control unit 215 indicates power supply paths of a DC power supply as the driving power supply.

The power control unit 211 includes a power receiving monitoring portion (detection unit) 2111, a power receiving control portion 2112, and a switch SW21. The power receiving monitoring portion 2111 and the power receiving control portion 2112 are activated by the electric power supplied from the host 11. The power receiving monitoring portion 2111 monitors whether or not the electric power is supplied from the host 11. The power receiving control portion 2112 turns the switch SW21 on or turns the switch SW21 off on the basis of the monitoring result of the power receiving monitoring portion 2111.

Specifically, when the switch SW21 is turned on by the power receiving control portion 2112, the electric power is supplied from an AC power supply (not shown in figures) to the power supply unit 212. When the switch SW21 is turned off by the power receiving control portion 2112, the electric power supply from the AC power supply (not shown in figures) to the power supply unit 212 is stopped.

The power receiving control portion 2112 of the power control unit 211 turns on the switch SW31 of the power switching unit 216 or turns off the switch SW31 of the power switching unit 216 on the basis of the instruction of the power supply control unit 111 of the host 11. In the steady state, the amount of power consumption of the power control unit 211 and the starting condition monitoring unit 214 is within the range of the amount of electric power supplied from the host 11. However, for example, when the switch SW21 is turned on, the amount of power consumption may be increased and be larger than the amount of the supplied electric power. In consideration of this situation, the power supply control unit 111 of the host 11 instructs the power receiving control portion 2112 to turn the switch SW31 on such that the electric power is temporarily supplied from the power storing unit 217. Accordingly, since the electric power is supplied from the host 11 to the power control unit 211 and the electric power is also supplied from the power storing unit 217, the amount of the supplied electric power increases. Consequently, it is avoided that the amount of power consumption is larger than the amount of supplied electric power. In this manner, in the steady state, only the host 11 supplies the electric power. When the amount of power consumption is increased, the electric power is also supplied from the power storing unit 217 so as to replenish the power shortage.

Additionally, the switch SW21 of the power control unit 211 is configured to be mechanically turned on or turned off by using an electromagnet or the like. Such the switch SW21 may be disposed in the heating area as well. However, since the switch SW21 applies the current to the coil, the amount of power consumption may increase at the time of turning the switch on or turning the switch off. The switch SW31 of the power switching unit 216, for example, is a semiconductor relay configured to be electrically turned on or turned off by using a transistor or the like. The amount of power consumption of the switch SW31 at the time of turning the switch on or turning the switch off is smaller than that of the mechanical switch using the electromagnet or the like.

The power supply unit 212 is a low voltage power supply (LVPS) built in the client 21. When the AC power is supplied due to turning the switch SW21 on, the power supply unit 212 supplies the electric power to the engine control unit 213 and the network control unit 215. The power supply unit 212 supplies the electric power to the power storing unit 217.

The engine control unit 213 is to control each unit (each device) of the image forming apparatus. For example, in case of the image forming apparatus using electrophotography, the engine control unit 213 drives and controls an exposure device, a photoreceptor drum, a fixing device, and the like (not shown in figures). The engine control unit 213 sends information about various switch manipulation by a user to the starting condition monitoring unit 214.

The starting condition monitoring unit 214 monitors various signals (trigger signals) for starting the client 21. That is, the starting condition monitoring unit 214 monitors the starting timing of the client 21 by detecting the situation of working people in the office (monitor information, starting signal, and starting information) or the like. Specifically, the starting condition monitoring unit 214 includes a net monitoring portion 2141, a timer monitoring portion 2142, a sensor monitoring portion 2143, and a switch monitoring portion 2144. The starting condition monitoring unit 214 receives the data from the power control unit 211, the engine control unit 213, and the network control unit 215 and sends the data to the power control unit 211, the engine control unit 213, and the network control unit 215.

Herein, the net monitoring portion 2141 monitors the printing instruction or the like from the data switching unit 112 through the data communication line Cd. That is, the net monitoring portion 2141 judges whether or not each units of the image forming apparatus is needed to be controlled by the engine control unit 213. The net monitoring portion 2141 is activated by the electric power supplied through the power supply line Cp. Accordingly, when the switch SW11 of the host 11 is turned on, the net monitoring portion 2141 performs the monitoring operation.

The timer monitoring portion 2142 monitors whether or not the current time is the period during office hours on the basis of the time information. For example, when the information that the office hours are from 9 a.m. to 5 p.m. is inputted in advance, the timer monitoring portion 2142 judges whether or not the current time is the period during office hours by acquiring the current time.

The sensor monitoring portion 2143 monitors a sensor (brightness-information detecting unit) (not shown in figures) which detects turning on a light in the office where the network system is placed or the increase of the amount of daylight. The sensor (not shown in figures) may be configured by a sensor detecting a variety of information. For example, it may be considered that a sensor detects the operative information in the office such as unlocking of the door in the office, the amount of power consumption in the office, conditions in the office such as noises, or starting information of operating the copy machine such as preparing a document for printing on the client 21. For example, it may be also considered that the sensor (not shown in figures) detects monitor information such as a printing history, the amount of communication, the amount of electric power, the period of power distribution, detects received information such as receiving a facsimile and instructing a printing, detects operative information (printing-instruction process information, status information, power on/off information, using information, returning time, and the like) of the lower-level clients (reference numerals 3a to 3c in FIG. 1), or detects information of existence or non-existence of security.

The switch monitoring portion 2144 monitors a mode changing switch disposed on a control panel (not shown in figures) of the client 21. For example, the switch monitoring portion 2144 monitors a button manipulated by a user to return from an energy-saving mode.

The network control unit 215 is activated by the electric power supplied from the power supply unit 212. When the electric power is supplied to the network control unit 215, the network control unit 215 performs the functions that the net monitoring portion 2141 of the starting condition monitoring unit 214 has performed until that time. In this manner, the amount of power consumption of the starting condition monitoring unit 214 is suppressed. The network control unit 215 sends the image data, which is sent from the host 11 through the data communication line Cd, to the engine control unit 213.

The power switching unit 216 has the switch SW31. On one side of the switch SW31, the switch SW31 is connected to the power supply unit 212 and the power storing unit 217. On the other side of the switch SW31, the switch SW31 is connected to the power control unit 211. The power receiving control portion 2112 of the power control unit 211 turns the switch SW31 on or turns the switch SW31 off.

The power storing unit 217 supplies the electric power to the power control unit 211 when the switch SW31 is turned on. That is, the power storing unit 217 replenishes the amount of power consumption of the client 21 by using a capacitor, a battery, or the like.

The power storing unit 217 stores the electric power supplied from the power supply unit 212 when the switch SW21 is turned on and the switch SW31 is turned off. The power storing unit 217, for example, may be the known power storing unit that is suitable for instantaneously energy supply such as a lithium-ion battery and an electric double layer capacitor. The lithium-ion battery or the like is suitable for driving a relay at a short time.

Figure 3:
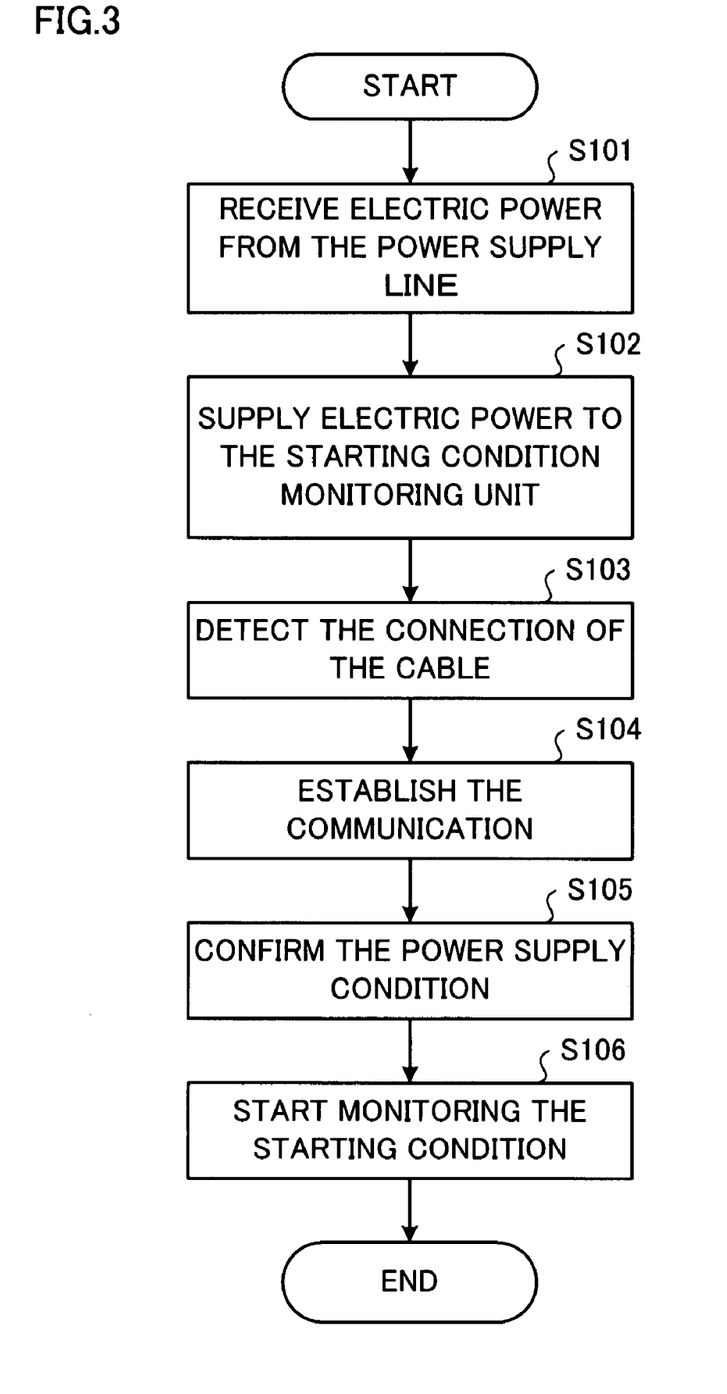
FIG. 3 is a flowchart illustrating a process sequence of the host and the client.

FIG. 3 is a flowchart illustrating a process sequence of the host 11 and the client 21. The flowchart shown in FIG. 3 illustrates a process sequence till the time when it is transferred to the starting state of monitoring the starting condition (steady state, monitoring state) after receiving the electric power through the power supply line Cp.

As shown in FIG. 3, when the cable CA11 is connected, the electric power is supplied to the client 21 through the power supply line Cp of the cable CA11. Then, the power control unit 211 of the client 21 receives the electric power from the host 11 through the power supply line Cp (step 101). The power control unit 211 supplies the received electric power to the starting condition monitoring unit 214 (step 102). In other words, the electric power through the power supply line Cp is supplied to the starting condition monitoring unit 214 via the power receiving monitoring portion 2111 and the power receiving control portion 2112.

When the power supply control unit 111 of the host 11 detects that the cable CA11 is connected, through the data switching unit 112 (step 103), the starting condition monitoring unit 214 receiving the electric power is activated in order to establish the communication with the host 11 through the data communication line Cd (step 104). Then, the power supply control unit 111 of the host 11 confirms the power supply conditions and the like between the power receiving monitoring portion 2111 and the power receiving control portion 2112 of the power control unit 211 (step 105). That is, the power receiving monitoring portion 2111 and the power receiving control portion 2112 report, to the power supply control unit 111 of the host 11, the amount of power consumption on the occasion of turning on the switches SW21 and SW31 and turning off the switches SW21 and SW31 or the amount of power consumption at each mode (state) of the image forming apparatus. In addition, the power supply control unit 111 of the host 11 acquires, for example, information about the capability of the power supply through the power supply line Cp.

The starting condition monitoring unit 214 starts monitoring the starting-condition (step 106). The starting condition includes various signals for starting the operation of the client 21, for example, a signal for communicating which the host 11 instructs or a signal for preparation of a document and the like for the starting condition of the image forming apparatus.

Additionally, when the starting condition monitoring unit 214 starts monitoring the starting conditions, the power receiving monitoring portion 2111 and the power receiving control portion 2112 monitor the amount of electric power or the presence or absence of power supply. That is, the power receiving monitoring portion 2111 and the power receiving control portion 2112 monitor the presence or absence of the electric power supplied from the host 11, and monitor the amount of power consumption of the client 21. The starting condition monitoring unit 214, for example, instructs the engine control unit 213 to change the operation mode of the image forming apparatus on the basis of the monitoring result of the timer monitoring portion 2142. For example, the starting condition monitoring unit 214 instructs the engine control unit 213 to enter into the energy-saving mode or to return from the energy-saving mode.

Figure 4:
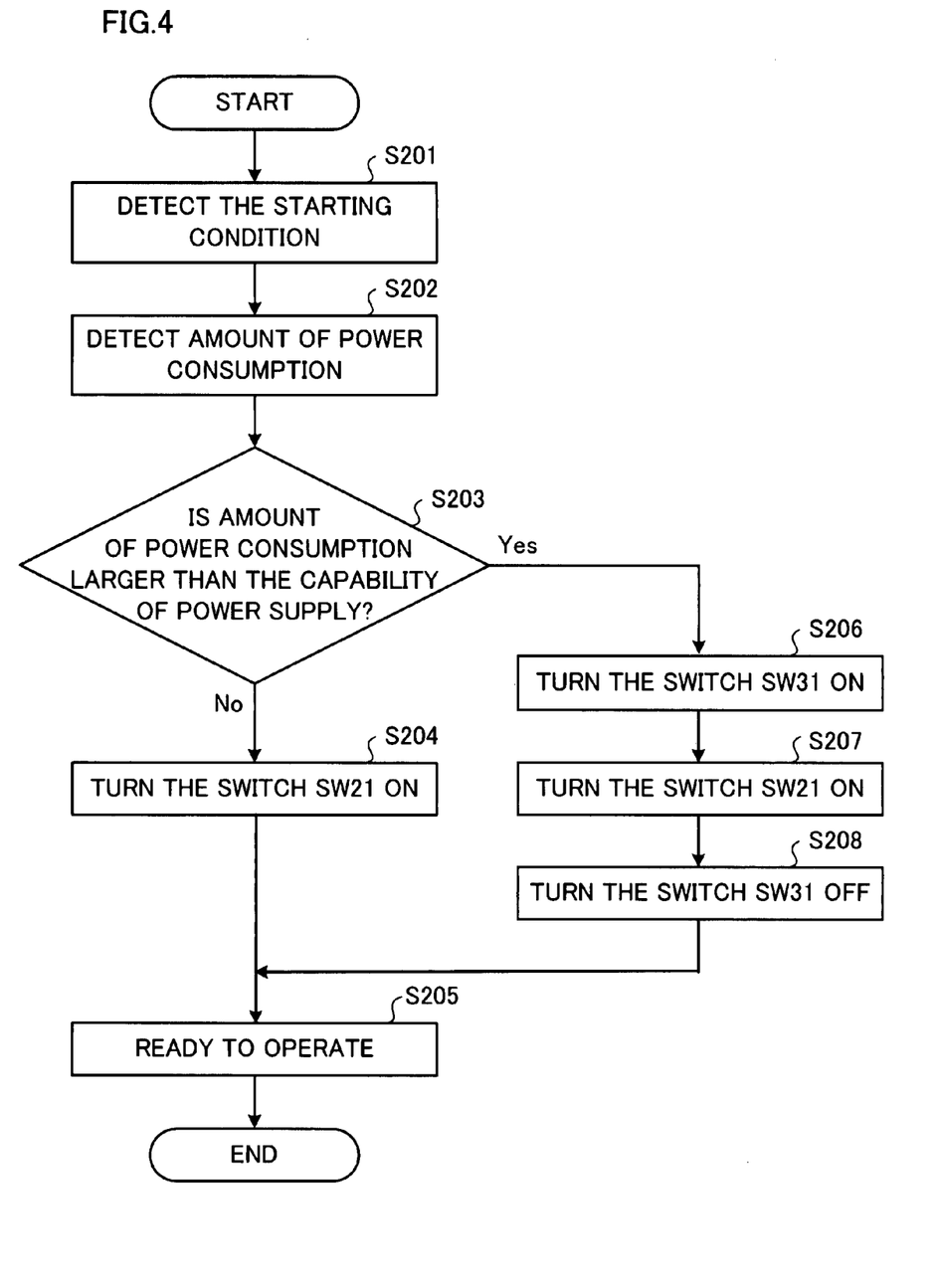
FIG. 4 is a flowchart illustrating a process sequence of the host and the client.

FIG. 4 is a flowchart illustrating a process sequence of the host 11 and the client 21.

The flowchart in FIG. 4 shows the process sequence till the time when the image forming apparatus is entered into the operating state after the starting-condition is detected and the image forming apparatus becomes ready to operate under monitoring the starting state. For example, when the host 11 sends a printing instruction to the starting condition monitoring unit 214 through the data communication line Cd, the starting condition monitoring unit 214 detects the starting condition (step 201). When the starting condition monitoring unit 214 detects the starting condition, the detected starting condition is reported to the power control unit 211. The power receiving monitoring portion 2111 and the power receiving control portion 2112 of the power control unit 211 receiving the report detect the amount of power consumption of the client 21 (step 202), and report it to the power supply control unit 111 of the host 11 through the data communication line Cd. The power supply control unit 111 judges whether or not the amount is larger than the capability of the power supply of the host 11 by using the varieties of information acquired in advance (step 203). For example, when the power receiving control portion 2112 turns the switch SW21 on so as to operate the image forming apparatus, the power supply control unit 111 judges whether or not the amount of power consumption of the client 21 is larger than the amount of electric power supplied from the host 11.

When the power supply control unit 111 of the host 11 judges that the amount of power consumption is not larger than the amount of the supplied power at the time of turning the switch SW21 on, the power supply control unit 111 instructs the power receiving control portion 2112 to turn on the switch SW21 of the power control unit 211. The instructed power receiving control portion 2112 turns the switch SW21 on (step 204). The switch SW31 of the power switching unit 216 is off. In this manner, the electric power from the power supply unit 212 is supplied to the engine control unit 213 and the network control unit 215 and then the image forming apparatus becomes ready to operate (step 205).

Returning to the step 203, when the power supply control unit 111 of the host 11 judges that the amount of power consumption at the time of the switch SW21 being turned on is larger than the amount of the supplied power (when the amount of power consumption increases), the power supply control unit 111 of the host 11 instructs the power receiving control portion 2112 to turn only the switch SW31 on. The power receiving control portion 2112 receiving the instruction also turns on the switch SW31 of the power switching unit 216, while the switch SW21 is off (step 206). As a result, the power control unit 211 is supplied with the electric power from the host 11 as well as the electric power from the power storing unit 217 so that it is avoided that the amount of power consumption exceeds the amount of the supplied power even when the switch SW21 requiring the large amount of power consumption at the time of switching is turned on.

The power supply control unit 111 of the host 11 instructs the power receiving control portion 2112 to turn the switch SW21 on and to turn the switch SW31 off (at the time of starting the printer). In this manner, the power receiving control portion 2112 turns the switch SW21 on (step 207) and turns the switch SW31 off (step 208). That is, the power supply control unit 111 instructs the power receiving control portion 2112 to turn the switches SW21 and SW31 on or turn the switches SW21 and SW31 off such that the switch SW31 is turned on only in a period when the power consumption temporarily increases such as when the switch SW21 is turned on.

When the switch SW21 is turned on and the switch SW31 is turned off, the power storing unit 217 stores the electric power from the power supply unit 212.

Second Exemplary Embodiment

Figure 5:
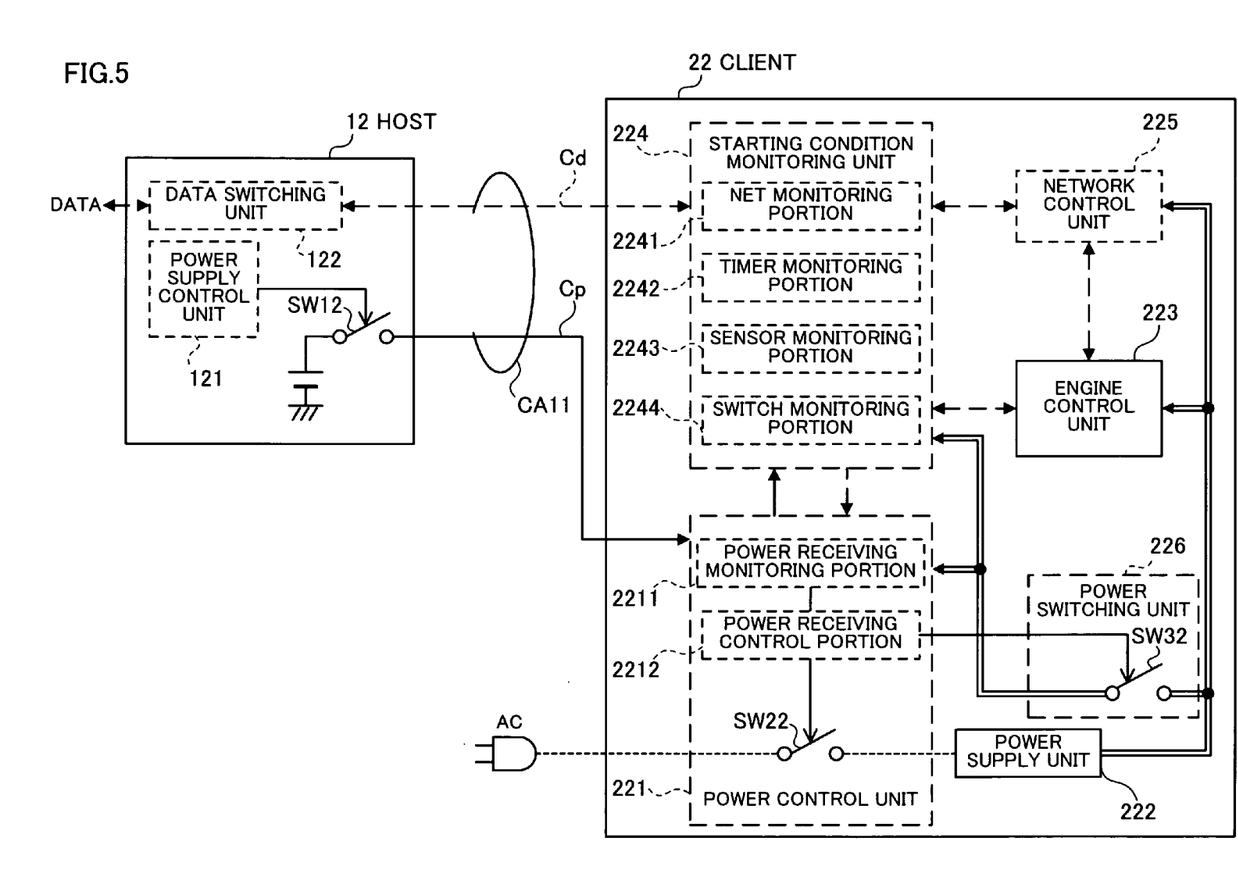
FIG. 5 is a block diagram illustrating a configuration of the host and the client according to the second exemplary embodiment.

FIG. 5 is a block diagram illustrating a configuration of the host 12 and a client 22 according to the second exemplary embodiment.

As shown in FIG. 5, the host 12 and the client 22 are respectively connected by a cable CA11 including a power supply line Cp and a data communication line Cd.

The host 12 shown in FIG. 5 is the same configuration as the host 11 shown in FIG. 2. That is, the host 12 includes a power supply control unit (change unit, detection unit) 121, a data switching unit 122, and a switch (change unit, switch element) SW12. The power supply control unit 121 instructs a power receiving control portion (change unit) 2212 of a power control unit (monitor unit) 221 to turn the switches (change unit, switch element) SW22 and SW32 on or to turn the switches (change unit, switch element) SW22 and SW32 off through the data communication line Cd and a starting condition monitoring unit (monitor unit) 224.

The basic configuration of the client 22 shown in FIG. 5 is the same as the client 21 shown in FIG. 2. That is, the client 22 includes the power control unit 221, a power supply unit (main power supply) 222, an engine control unit 223, the starting condition monitoring unit 224, a network control unit 225, and a power switching unit 226. These may be the same configurations as the power control unit 211, the power supply unit 212, the engine control unit 213, the starting condition monitoring unit 214, the network control unit 215, and the power switching unit 216 in the client 21, respectively. In addition, the power control unit 221 includes a power receiving monitoring portion (detection unit) 2211, the power receiving control portion 2212, and a switch SW22. The client 22 does not have a configuration corresponding to the power storing unit 217 in the client 21. The starting condition monitoring unit 224 includes a net monitoring portion 2241, a timer monitoring portion 2242, a sensor monitoring portion 2243, and a switch monitoring portion 2244.

Additionally, any unit to which the electric power from the power supply unit 222 is supplied may be changed by turning on and turning off of the switch SW32 of the power switching unit 226. Specifically, when the switch SW32 is turned off, the units to which the electric power from the power supply unit 222 is supplied are the engine control unit 223 and the network control unit 225. When the switch SW32 is turned on, the units to which the electric power from the power supply unit 222 is supplied are the engine control unit 223 and the network control unit 225 as well as the power control unit 221 and the starting condition monitoring unit 224.

Herein, the power receiving control portion 2212 of the power control unit 221 turns the switch SW32 on or turns the switch SW32 off. The switch SW32 is a so-called self-holding switch that holds the state of the switch when the supply of the electric power from the power receiving control portion 2212 is stopped.

In the exemplary embodiment, it is assumed that the amount of power consumption at the time of switching the switches SW22 and SW32 is covered by the amount of the electric power supplied through the power supply line Cp. In addition, since the switch SW32 is the self-holding switch, the amount of power consumption of the client 22 is suppressed when the power supply control unit 121 of the host 12 temporarily stops supplying the electric power to the switch SW32 at the time of turning on or turning off of the switch SW22. Accordingly, the power supply control unit 121 controls the amount of power consumption not to be larger than the amount of the power supplied through the power supply line Cp.

Figure 6:
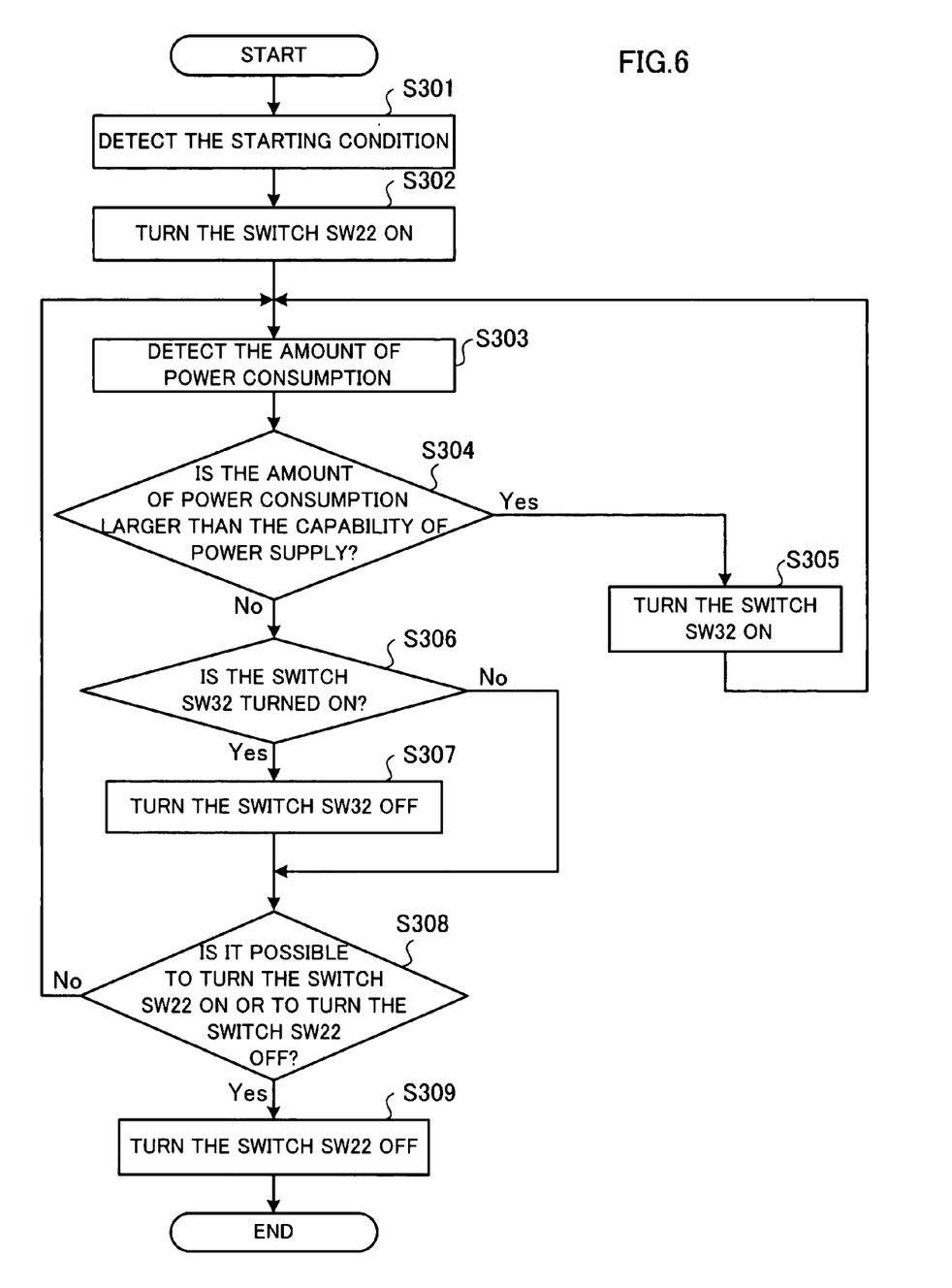
FIG. 6 is a flowchart illustrating a process sequence of the host and the client.

FIG. 6 is a flowchart illustrating a process sequence of the host 12 and the client 22. The process sequence till the time when the switch SW12 is turned on to start monitoring the starting condition is the same as shown in FIG. 3 and thus the description thereof is omitted.

For example, when the host 12 instructs the starting condition monitoring unit 224 to print out through the data communication line Cd, the starting condition monitoring unit 224 detects the starting condition (step 301). When the starting condition monitoring unit 224 detects the starting condition, the detected starting conditions are reported to the power supply control unit 121. The power supply control unit 121 instructs the power receiving monitoring portion 2211 and the power receiving control portion 2212 to turn the switch SW22 on. In this manner, the power receiving monitoring portion 2211 and the power receiving control portion 2212 turn the switch SW22 on (step 302). The power receiving monitoring portion 2211 and the power receiving control portion 2212 of the power control unit 221 detect the amount of power consumption of the client 22 (step 303) and the detected amount of power consumption is reported to the power supply control unit 121 of the host 12 through the data communication line Cd. The power supply control unit 121 judges whether or not the amount of power consumption is larger than the power supply capability of the host 12 by using the varieties of information acquired in advance (step 304). That is, the power supply control unit 121 judges whether or not the amount of power consumption of the power control unit 221 and the starting condition monitoring unit 224 is larger than the amount of the power supplied from the host 12.

When the power supply control unit 121 of the host 12 judges that the amount of power consumption is larger than the capability of the power supply (an urgent status when further electric power should be supplied), the power supply control unit 121 instructs the power receiving control portion 2212 to turn the switch SW32 of the power switching unit 226 on. The instructed power receiving control portion 2212 turns the switch SW32 on (step 305). In this manner, the electric power is supplied from the power supply unit 222 to the power control unit 221 and the starting condition monitoring unit 224. That is, the power supply unit 222 supplies the electric power to all units of the client 22 that consume the electric power. Additionally, in case the switch SW12 of the host 12 is turned off while the switch SW32 is on, there is no influence on the client 22 even when the electric power is not supplied through the power supply line Cp. Even when the switch SW12 is turned off to stop supplying the electric power, the communication is established through the data communication line Cd. Accordingly, the data or signal is received and sent between the host 12 and the client 22 to each other.

In addition, the processing goes back to the step 303.

In the step 304, when the power supply control unit 121 of the host 12 judges that the amount of power consumption is not larger than the capability of the power supply, the power supply control unit 121 detects whether or not the switch SW32 is turned on (step 306). When the switch SW32 is on, the power supply control unit 121 instructs the power receiving control portion 2212 to turn the switch SW32 off. The instructed power receiving control portion 2212 turns the switch SW32 off (step 307). When the switch SW32 is not on, the power supply control unit 121 proceeds to the step 308.

The power supply control unit 121 judges whether or not the switch SW22 is to be turned off (step 308). That is, for example, when a timer monitoring portion 2242 of the starting condition monitoring unit 224 detects that the current time is out of office hours, the power supply control unit 121 instructs the power receiving control portion 2212 to turn the switch SW22 off so as to suppress the amount of power consumption. The instructed power receiving control portion 2212 turns the switch SW22 off (step 309). In addition, when the timer monitoring portion 2242 of the starting condition monitoring unit 224 does not detect that the current time is out of office hours, the processing goes back to the step 303.

The exemplary embodiment is to be applied to the case the amount of power consumption of the power control unit 221 and the starting condition monitoring unit 224 is larger than the amount of the electric power supplied through the power supply line Cp, but the exemplary embodiment is also applied to the other cases. For example, when the electric power is not supplied due to the breakdown of the host 12 or the excessive supply of the electric power, the operation of the image forming apparatus of the client 22 should not be stopped inadvertently. Since stopping the supply of the electric power from the host 12 makes surplus electric power within the capability of the power supply from the host 12, more devices may be connected to the host 12.

Third Exemplary Embodiment

Figure 7:
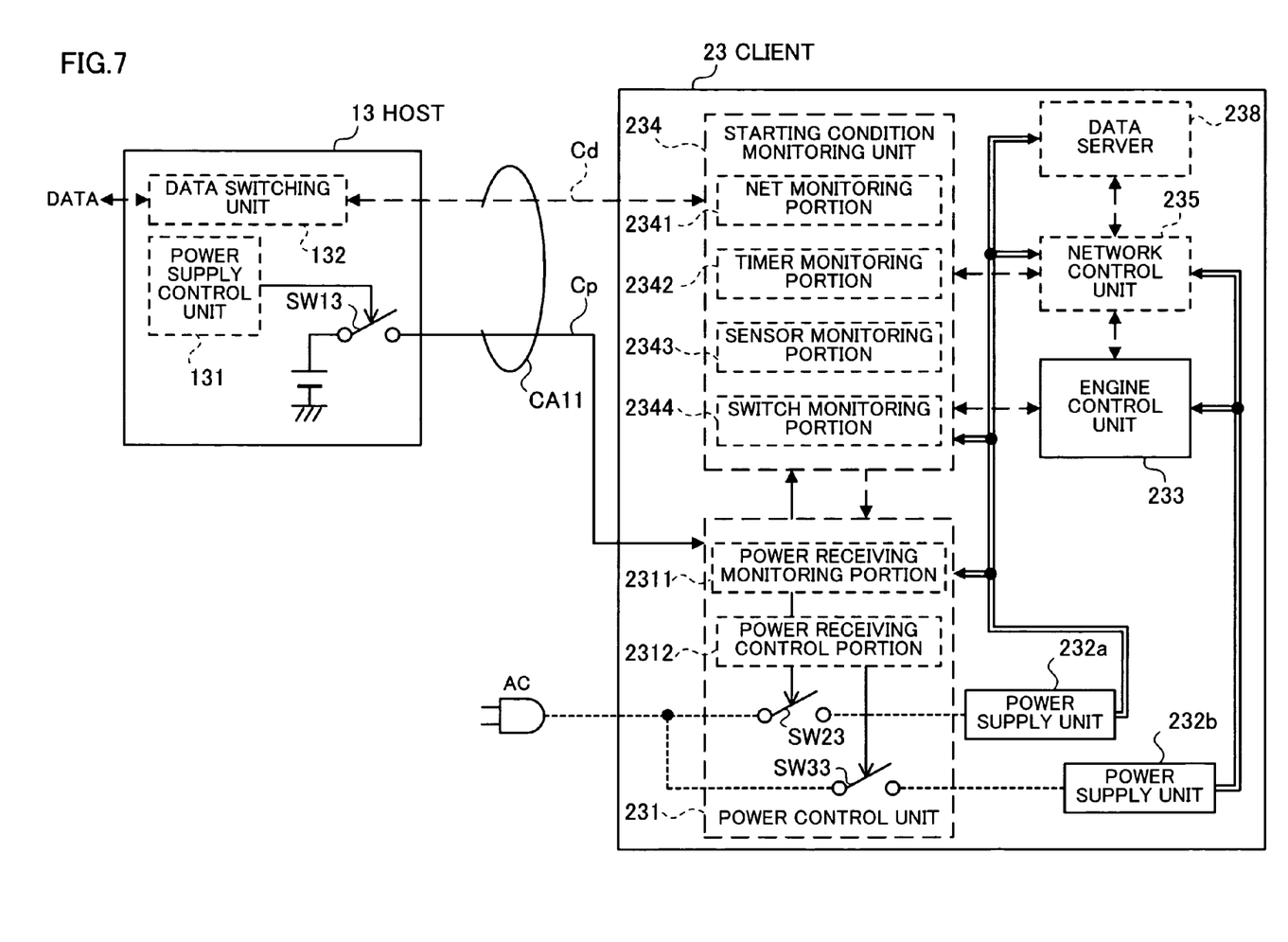
FIG. 7 is a block diagram illustrating a configuration of a host and a client according to the third exemplary embodiment.

FIG. 7 is a block diagram illustrating a configuration of a host 13 and a client 23 according to the third exemplary embodiment.

As shown in FIG. 7, the host 13 and the client 23 are respectively connected by the cable CA11 including the power supply line Cp and the data communication line Cd.

The host 13 shown in FIG. 7 is the same configuration as the host 11 shown in FIG. 2. That is, the host 13 includes a power supply control unit (change unit, detection unit) 131, a data switching unit 132, and a switch (change unit, switch element) SW13. The power supply control unit 131 instructs a power receiving control portion (change unit) 2312 of a power control unit (monitor unit) 231 through the data communication line Cd and a starting condition monitoring unit (monitor unit) 234 to turn the switches (change unit, switch element) SW23 and SW33 on or turn the switches (change unit, switch element) SW23 and SW33 off.

The basic configuration of the client 23 shown in FIG. 7 is the same as the client 21 shown in FIG. 2. That is, the client 23 includes the power control unit 231, power supply units 232a and 232b, an engine control unit 233, the starting condition monitoring unit 234, and a network control unit 235. These units may be the same configurations as the power control unit 211, the power supply unit 212, the engine control unit 213, the starting condition monitoring unit 214, and the network control unit 215 in the client 21, respectively. That is, the starting condition monitoring unit 234 includes a net monitoring portion 2341, a timer monitoring portion 2342, a sensor monitoring portion 2343, and a switch monitoring portion 2344.

The client 23 has a data server 238 in association with high-functionalization of the image forming apparatus.

Herein, the power control unit 231 includes a power receiving monitoring portion (detection unit) 2311, a power receiving control portion 2312, and switches SW23 and SW33. The switches SW23 and SW33 are turned on or turned off by the power receiving control portion 2312 that was instructed by the power supply control unit 131. The switch SW23 is connected to the power supply unit 232a. The switch SW33 is connected to the power supply unit 232b. The power supply unit 232a is to supply the electric power to the power control unit 231, the starting condition monitoring unit 234, the network control unit 235, and the data server 238. The power supply unit 232b is to supply the electric power to the engine control unit 233 and the network control unit 235. As described above, the exemplary embodiment is configured to change the state of power supply to the units of the client 23 that consume the electric power by turning the switches SW23 and SW33 on or turning the switches SW23 and SW33 off.

Additionally, in the steady state (waiting time) the switch SW13 is on and the switches SW23 and SW33 are off. Accordingly, for example, in the monitor mode such as the printing instruction at waiting time, the amount of power consumption (ex. 10 W) necessary for the power control unit 231 and the starting condition monitoring unit 234 is supplied through the power supply line Cp similarly to the first and second exemplary embodiments.

At the time of the operation without printing data such as storing data in the data server 238, that is, at the non-printing time, the power supply control unit 131 turns the switch SW23 on and turn the switches SW13 and SW33 off. Accordingly, the electric power is not supplied through the power supply line Cp and the electric power is instead supplied from the power supply unit 232a to the power control unit 231, the starting condition monitoring unit 234, the network control unit 235, and the data server 238. That is, by starting the power supply unit 232a, the electric power is supplied to the operating units other than the print unit of the client 23. When the data server 238 is activated, the necessary amount of power consumption (ex. 70 W) does not be supplied through the power supply line Cp. Accordingly, the electric power is supplied by the power supply unit 232a that supplies larger amount of the power supply than the power supply line Cp.

At the time of printing (printing operation time), the power supply control unit 131 turns the switches SW23 and SW33 on and turns the switch SW13 off. In this manner, the necessary amount of power consumption (ex. 1000 W) is supplied by the power supply units 232a and 232b, whereby the electric power is supplied to all power consuming units of the client 23.

As described above, in the exemplary embodiment, the electric power is not supplied to the power consuming units other than the operating units. The electric power is supplied from the optimal power supply appropriate for power consumption.

Fourth Exemplary Embodiment

Figure 8:
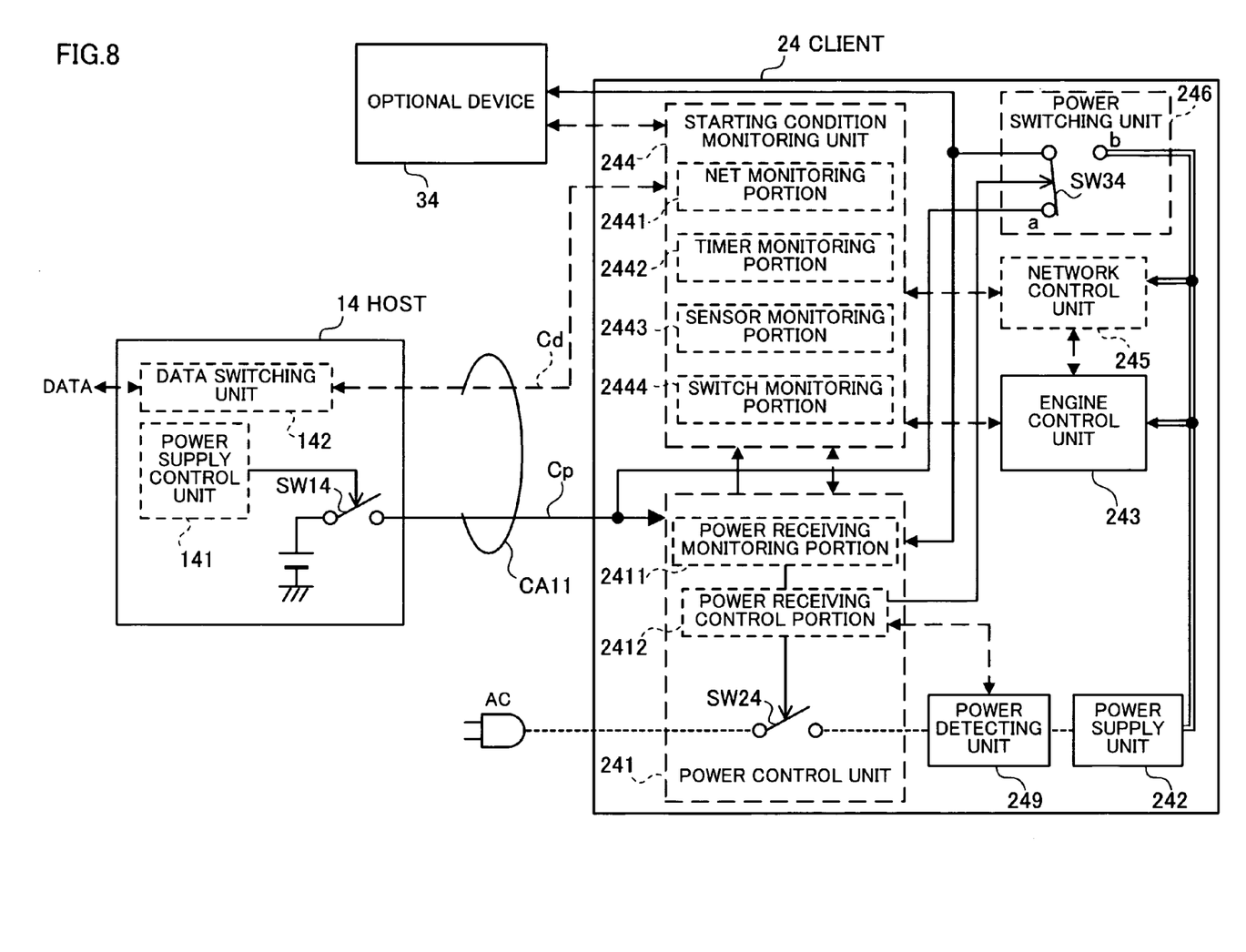
FIG. 8 is a block diagram illustrating a configuration of a host and a client according to the fourth exemplary embodiment.

FIG. 8 is a block diagram illustrating a configuration of a host 14 and a client 24 according to the fourth exemplary embodiment.

As shown in FIG. 8, the host 14 and the client 24 are respectively connected by the cable CA11 including the power supply line Cp and the data communication line Cd.

The host 14 shown in FIG. 8 is the same configuration as the host 11 shown in FIG. 2. That is, the host 14 includes a power supply control unit (change unit, detection unit) 141, a data switch unit 142, and a switch (change unit, switch element) SW14. The power supply control unit 141 instructs a power receiving control portion (change unit) 2412 of a power control unit (monitor unit) 241 through the data communication line Cd and a starting condition monitoring unit (monitor unit) 244 to turn the switches (change unit, switch element) SW24 and SW34 on or to turn the switches (change unit, switch element) SW24 and SW34 off.

The basic configuration of the client 24 shown in FIG. 8 is the same as the client 21 shown in FIG. 2. That is, the client 24 includes a power control unit 241, a power supply unit (main power supply) 242, an engine control unit 243, a starting condition monitoring unit 244, a network control unit 245, and a power switching unit 246. These units may be the same configurations as the power control unit 211, the power supply unit 212, the engine control unit 213, the starting condition monitoring unit 214, the network control unit 215, and the power switching unit 216 in the client 21, respectively. That is, the power control unit 241 includes a power receiving monitoring portion 2411, a power receiving control portion 2412, and a switch SW24. The starting condition monitoring unit 244 includes a net monitoring portion 2441, a timer monitoring portion 2442, a sensor monitoring portion 2443, and a switch monitoring portion 2444.

The client 24 has a power detecting unit (detection unit) 249 that detects the amount of electric power of the power supply unit 242. The power detecting unit 249 reports the detection result by using the power receiving control portion 2412 and the starting condition monitoring unit 244 through the data communication line Cd to the power supply control unit 141.

An optional device 34 of an image forming apparatus is connected to the client 24. The optional device 34 is supplied with the electric power from the client 24 and is configured to receive data from the client 24 and send data to the client 24. An example of the optional device 34 is a security device or the like. In the exemplary embodiment, the optional device 34 is disposed outside the client 24. However, the optional device 34 may be configured in a similar manner when it is disposed inside the client 24.

Herein, the power control unit 241 includes a power receiving monitoring portion (detection unit) 2411, a power receiving control portion 2412, and a switch SW24. The power switching unit 246 includes a switch SW34 having two contact points a and b. When the switch SW34 is switched to the contact point a, the electric power is supplied from the host 14 through the power supply line Cp to the optional device 34 and the power control unit 241. When the switch SW34 is switched to the contact point b and the switch SW24 is turned on, the electric power is supplied from the power supply unit 242 to the optional device 34 and the power receiving control portion 2412. When the switch SW24 is turned off, the electric power is not supplied from the power supply unit 242 to the optional device 34 and the power receiving control portion 2412. Irrespective of turning the switch SW34 or turning the switch SW34 off, the electric power is supplied from the host 14 through the power supply line Cp to the power control unit 241.

Additionally, at the steady state (1), the switch SW14 is turned on, the switch SW24 is turned off, and the switch SW34 is switched to the contact point b. In this state, the electric power is supplied through the power supply line Cp to the power control unit 241 and the starting condition monitoring unit 244. In addition, the electric power is not supplied to the optional device 34.

Meanwhile, at the steady state (2), the switch SW34 is switched to the contact point a from the steady state (1). Accordingly, the electric power is supplied through the power supply line Cp to the optional device 34 as well.

At the time of starting the printer, the switch SW14 is turned on, the switch SW24 is turned on, and the switch SW34 is switched to the contact point b. In this state, the electric power is supplied through the power supply line Cp to the power control unit 241 and the starting condition monitoring unit 244. Further, the electric power is supplied from the power supply unit 242 to the engine control unit 243, the network control unit 245, the optional device 34, and the power control unit 241.

When the power detecting unit (detection unit) 249 judges that the electric power could be larger than the outlet capacity limit of 1500 VA (100V 15 A), the switch SW14 is turned on, the switch SW24 is turned on, and the switch SW34 is switched to the contact point a. In this state, the electric power is supplied through the power supply line Cp to the power control unit 241, the starting condition monitoring unit 244, and the optional device 34, and further the electric power is supplied from the power supply unit 242 to the engine control unit 243 and the network control unit 245. That is, by reducing the number of the units to which the electric power from the power supply unit 242 is supplied, the amount of the supplied power is suppressed. Additionally, when the power supply control unit 141 receiving the detection result of the power detecting unit 249 judges that the electric power could be larger than the general outlet capacity limit of 1500 VA (100V 15 A), the power supply control unit 141 controls the host 14 to supply the electric power to optional device 34. Accordingly, the circuit breaker is prevented from cutting off due to the over capacity exceeding the limit at the side of the client 24.

Fifth Exemplary Embodiment

Figure 9:
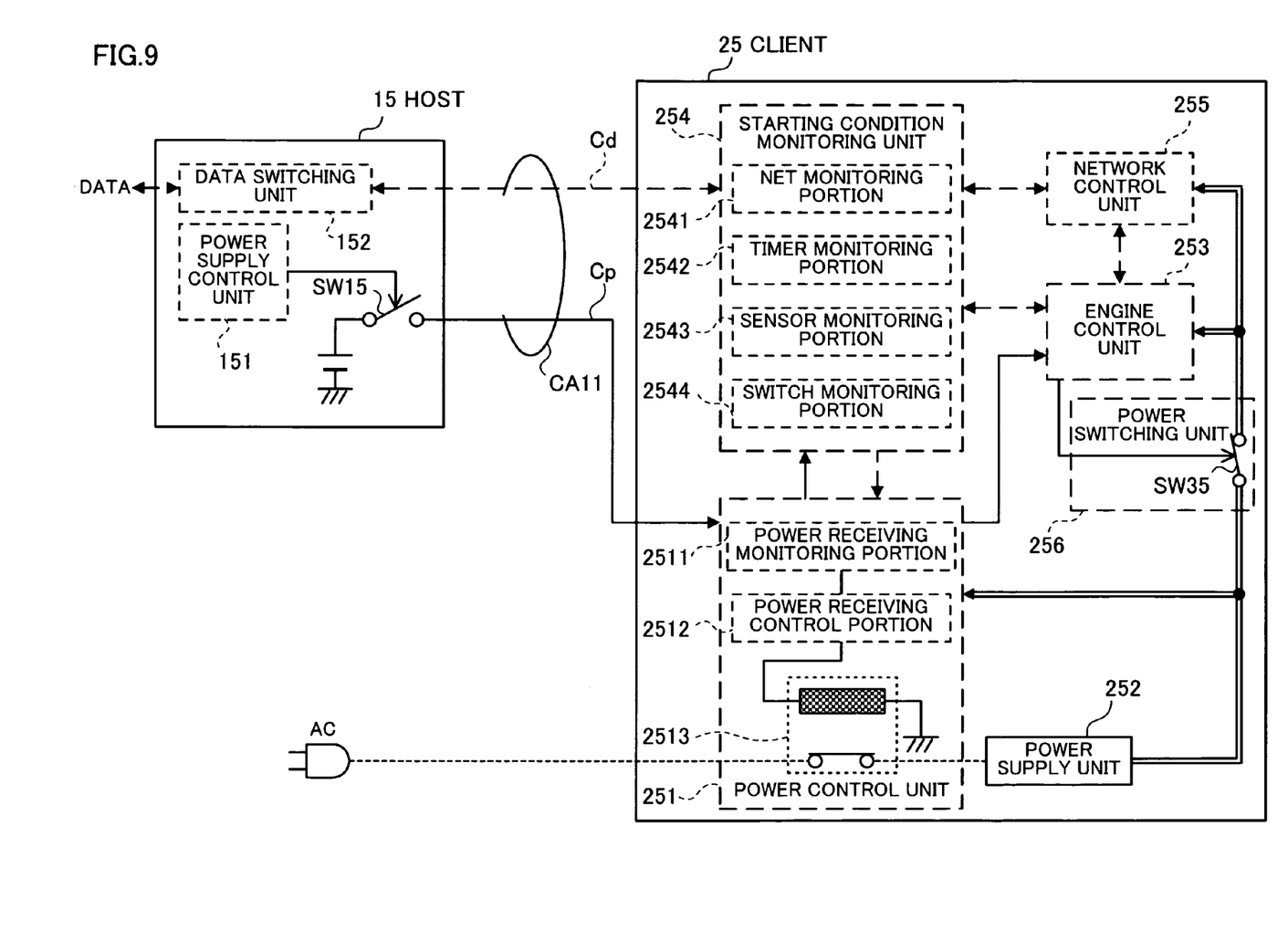
FIG. 9 is a block diagram illustrating a configuration of a host and a client according to the fifth exemplary embodiment.

FIG. 9 is a block diagram illustrating a configuration of a host 15 and a client 25 according to the fifth exemplary embodiment.

As shown in FIG. 9, the host 15 and the client 25 are respectively connected by the cable CA11 including the power supply line Cp and the data communication Cd.

The host 15 shown in FIG. 9 is the same configuration as the host 11 shown in FIG. 2. That is, the host 15 includes a power supply control unit (change unit, detection unit) 151, a data switching unit 152, and a switch (change unit, switch element) SW15.

The basic configuration of the client 25 shown in FIG. 9 is the same configuration as the client 21 shown in FIG. 2. That is, the client 25 includes a power control unit (monitor unit) 251, a power supply unit 252, an engine control unit (change unit) 253, a starting condition monitoring unit (monitor unit) 254, a network control unit 255, and a power switching unit 256. These units may be the same configurations as the power control unit 211, the power supply unit 212, the engine control unit 213, the starting condition monitoring unit 214, the network control unit 215, and the power switching unit 216 in the client 21, respectively. That is, the starting condition monitoring unit 254 includes a net monitoring portion 2541, a timer monitoring portion 2542, a sensor monitoring portion 2543, and a switch monitoring portion 2544.

Herein, the power control unit 251 includes a power receiving monitoring portion (detection unit) 2511, a power receiving control portion (change unit) 2512, and a latch relay (change unit) 2513. The latch relay 2513 employs a normally closed contact point. Accordingly, the latch relay 2513 is turned on when the current is not applied and is turned off when the current is applied.

The power switching unit 256 has a switch (change unit, switch element) SW35. The switch SW35 is turned on or turned off by the engine control unit 253.

Figure 10:
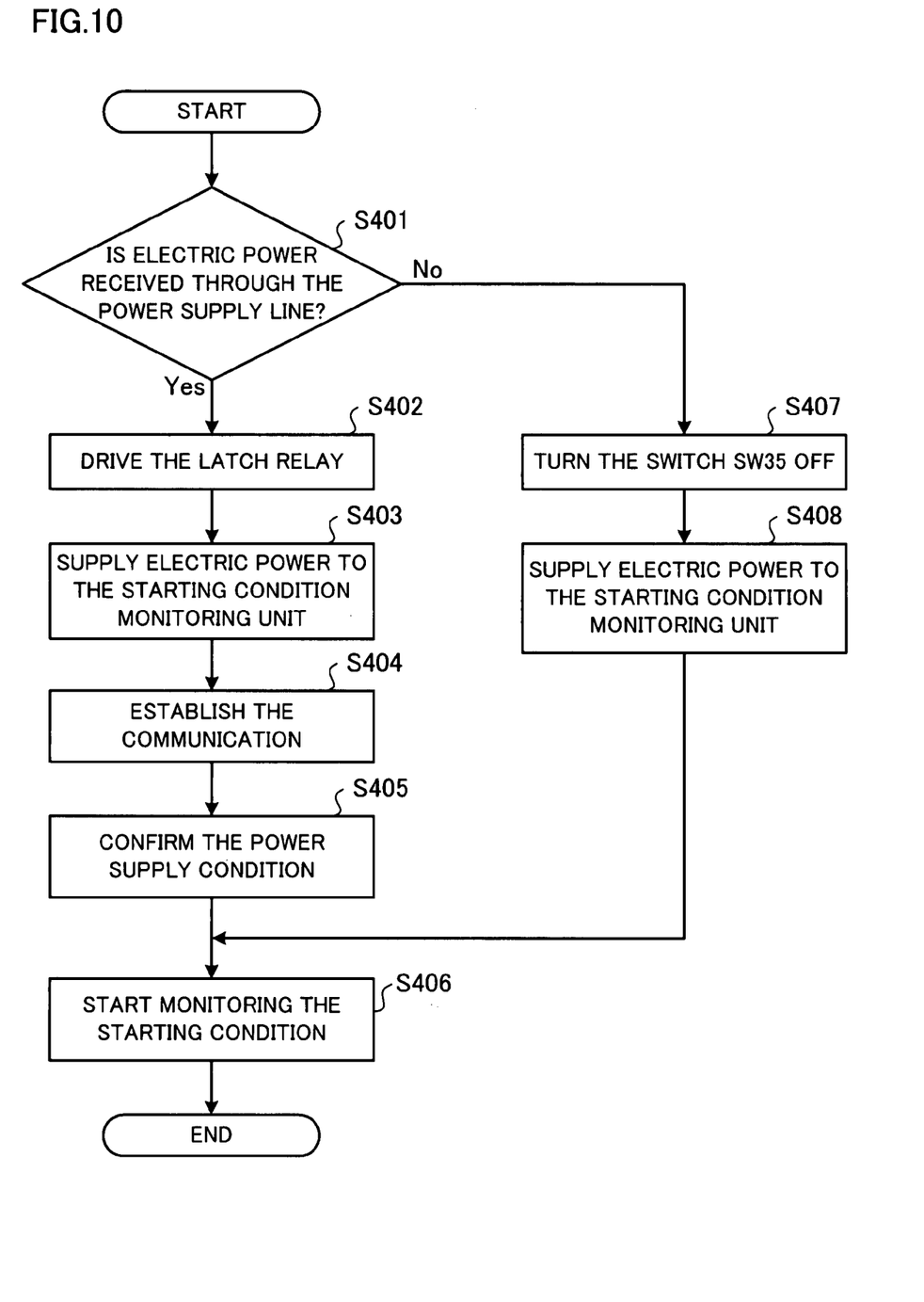
FIG. 10 is a flowchart illustrating a process sequence of the host and the client.

FIG. 10 is a flowchart illustrating a process sequence of the host 15 and the client 25.

As shown in FIG. 10, the power receiving monitoring portion 2511 judges whether or not the electric power is received from the power supply line Cp (step 401). When the power receiving monitoring portion 2511 judges that the electric power is received, the power receiving monitoring portion 2511 instructs the power receiving control portion 2512 to drive the latch relay 2513. The instructed power receiving control portion 2512 drives the latch relay 2513 to open (step 402). In this manner, the AC power is not supplied to the power supply unit 252, thereby suppressing the amount of power consumption of the client 25.

The power receiving monitoring portion 2511 supplies the received electric power to the starting condition monitoring unit 254 (step 403). The starting condition monitoring unit 254 receiving the electric power is activated to establish the communication with the host 15 through the data communication line Cd (step 404). Then, the power supply control unit 151 of the host 15 confirms the power supply condition or the like between the power receiving monitoring portion 2511 of the power control unit 251 and the power receiving control portion 2512 of the power control unit 251 (step 405). The starting condition monitoring unit 254 starts monitoring the starting condition (step 406).

Meanwhile, in the step 401, when the power receiving monitoring portion 2511 judges that the electric power is not received from the power supply line Cp, the power receiving monitoring portion 2511 takes it as the host 15 not responding to the power line communication and turns the switch SW35 off. After the switch SW35 is turned off, the power control unit 251 supplies the electric power to the engine control unit 253. In addition, since the latch relay 2513 employs the normally closed contact point, the electric power is supplied from the power supply unit 252 to the power control unit 251.

Herein, the various processes described in the exemplary embodiments are embodied by an application program executed by using a working memory of the hosts 11, 12, 13, 14, and 15. When the hosts 11, 12, 13, 14, and 15 (i.e. computers) are provided to customers (including users), the application program may be provided to the customers as the application program installed in a computer. In addition, a computer readable medium storing the program to be executed in the computer may be provided. The computer readable medium includes, for example, a CD-ROM or the like. The program is read and executed by a CD-ROM readable device (not shown in figures) or the like. The program may be provided, for example, by passing through a network interface via a network by a program transmitting device (not shown in figures). The program transmitting device, for example, has a memory that is disposed in the hosts 11, 12, 13, 14, and 15 and stores the program, and a program transmitting unit providing the program through the network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power supply management system comprising:
    an information processor;
    a terminal that is connected to the information processor by a communication line and a power supply line and that is controlled for power supply by the information processor, the terminal including a monitor unit that monitors a signal received from outside through the communication line and a signal detected inside by using the electric power supplied through the power supply line, a change unit that changes an internal power supply path so as to supply external electric power other than the electric power supplied through the power supply line on the basis of the monitoring results of the monitor unit;
    a power supply, wherein the change unit changes the internal power supply path to a first power supply path from the information processor through the power supply line or to a second power supply path from the power supply, alternatively; and
    a detection unit that detects the amount of the electric power supplied through the first power supply path, wherein the change unit changes the internal power supply path from the first power supply path to the second power supply path when the amount of the supplied electric power detected by the detection unit is larger than a predetermined value.

2. The power supply management system according to claim 1, wherein the change unit changes the internal power supply path by using the electric power supplied through the power supply line.

3. The power supply management system according to claim 1,
    wherein the change unit changes the internal power supply path so as to use a power supply path from the information processor through the power supply line in combination with a power supply path from the power supply.

4. A terminal comprising:
    a power receiving unit that receives electric power through a power supply line from an information processor and that is connected to the information processor by a communication line and the power supply line;
    a monitor unit that monitors a signal received from outside through the communication line and a signal detected inside by using the electric power supplied through the power supply line;
    a change unit that changes an internal power supply path so as to supply external electric power other than the electric power supplied through the power supply line;
    a power supply, wherein the change unit changes the internal power supply path to a first power supply path from the information processor through the power supply line or to a second power supply path from the power supply, alternatively; and
    a detection unit that detects the amount of the electric power supplied through the first power supply path, wherein the change unit changes the internal power supply path from the first power supply path to the second power supply path when the amount of the supplied electric power detected by the detection unit is larger than a predetermined value.

5. The terminal according to claim 4, wherein the detection unit detects the amount of the electric power supplied through the second power supply path,
    wherein the change unit changes the internal power supply path so as to supply electric power other than the electric power supplied through the power supply line to an external device, and
    wherein the change unit changes the internal power supply path from the second power supply path to the first power supply path when the amount of the supplied electric power detected by the detection unit through the second power supply path is larger than a predetermined value.

6. The terminal according to claim 4,
    wherein the change unit changes the internal power supply path from the first power supply path to the second power supply path when the amount of the electric power detected by the detection unit is smaller than or equal to a predetermined threshold value.

7. The terminal according to claim 4,
    wherein the change unit changes the internal power supply path from the first power supply path to the second power supply path when the detection unit detects that the electric power is not supplied.

8. The terminal according to claim 4, wherein the power supply line and the communication line are configured as a pair.

9. An information processor comprising:
    a controller that controls electric power supplied to a terminal connected by a communication line and a power supply line through the power supply line;
    a judgment unit that judges whether power consumption of the terminal is larger than electric power that is possible to be supplied through the power supply line; and
    an instruction unit that instructs the terminal through the communication line to change an internal power supply path arranged inside the terminal when the judgment unit judges that the power consumption is larger than the electric power that is possible to be supplied.

10. The information processor according to claim 9, wherein the controller controls to keep the electric power supplied to the terminal through the power supply line after the instruction unit instructs the terminal to change the internal power supply path.

11. The information processor according to claim 9, wherein the controller controls electric power not to be supplied to the terminal through the power supply line after the instruction unit instructs the terminal to change the internal power supply path.

12. The information processor according to claim 9, wherein the instruction unit gives instructions through the communication line for changing the internal power supply path to a first power supply path through the power supply line and a second power supply path from a power supply installed in the terminal, alternatively.

13. The information processor according to claim 9, wherein the power supply line and the communication line are configured as a pair.

14. A power supply management method in a power supply management system including:
- an information processor; and
- a terminal that is connected to the information processor by a communication line and a power supply line and that is controlled for power supply by the information processor, the power supply management method comprising:
- monitoring a signal received from outside through the communication line and a signal detected inside by using the electric power supplied through the power supply line;
- changing an internal power supply path so as to supply external electric power other than the electric power supplied through the power supply line on the basis of the monitoring results; and
- detecting the amount of the electric power supplied through a first power supply path, wherein, changing the internal power supply path includes:
  - changing the internal power supply path to the first power supply path from the information processor through the power supply line or to a second power supply path from a power supply, alternatively, and
  - changing the internal power supply path from the first power supply path to the second power supply path when the amount of the supplied electric power detected by the detection unit is larger than a predetermined value.

15. A non-transitory computer readable medium storing a program causing a computer to execute a process for controlling power supply to a terminal connected to an information processor through a communication line and a power supply line, the process comprising:
- controlling electric power supplied to the terminal through the power supply line;
- judging whether power consumption of the terminal is larger than the electric power that is supplied through the power supply line; and
- instructing the terminal through the communication line to change an internal power supply path arranged in the terminal at the time of judging the power consumption of the terminal is larger than the electric power that is supplied through the power supply line.

16. The computer readable medium according to claim 15, wherein the electric power is controlled to be continuously supplied to the terminal through the power supply line after instructing the terminal to change the internal power supply path.

17. The computer readable medium according to claim 15, wherein the electric power is controlled not to be supplied to the terminal through the power supply line after instructing the terminal to change the internal power supply path.

18. The computer readable medium according to claim 15, wherein the terminal is instructed through the communication line for changing the internal power supply path to a first power supply path through the power supply line and a second power supply path from a power supply installed in the terminal, alternatively.

* * * * *